Nov. 11, 1941.  J. MARGIS, JR  2,262,462

FISHING REEL

Filed May 31, 1941

INVENTOR
JOHN MARGIS JR.

BY

ATTORNEYS

Patented Nov. 11, 1941

2,262,462

UNITED STATES PATENT OFFICE 2,262,462

FISHING REEL

John Margis, Jr., Franksville, Wis.

Application May 31, 1941, Serial No. 396,077

4 Claims. (Cl. 242—84.5)

This invention appertains to fishing reels, and more particularly to anti-backlash attachments for fishing reels for preventing overrunning of the spool when a slack occurs in the line.

One of the primary objects of my invention is to provide a brake for the spools of fishing reels governed by the tension or pull on the line, so that when slack occurs in the line, the brake will automatically function to slow up or stop the rotation of the spool.

Another salient object of my invention is to provide an anti-backlash attachment which can be readily applied to reels of existing types, without any change in the mechanism thereof.

A further important object of my invention is to provide a brake mechanism arranged wholly at one side of the reel, whereby such brake mechanism will be out of the way of and not interfere with the operation of the level wind mechanism of the reel.

A still further object of my invention is to provide an anti-backlash attachment for fishing reels, which is of a simple and durable character embodying a minimum number of operating parts, and one which can be applied to a reel at a small cost and easily maintained in proper working condition.

With these and other objects in view, the invention consists in the novel construction, arrangement, and formation of parts, as will be hereinafter more specifically described, claimed, and illustrated in the accompanying drawing, in which drawing:

Referring to the drawing in detail, wherein similar reference characters designate corresponding parts throughout the several views, the letter A generally indicates my anti-backlash attachment for a reel R. The reel R can be associated with a fishing rod F in the usual or any preferred manner.

Figure 1:
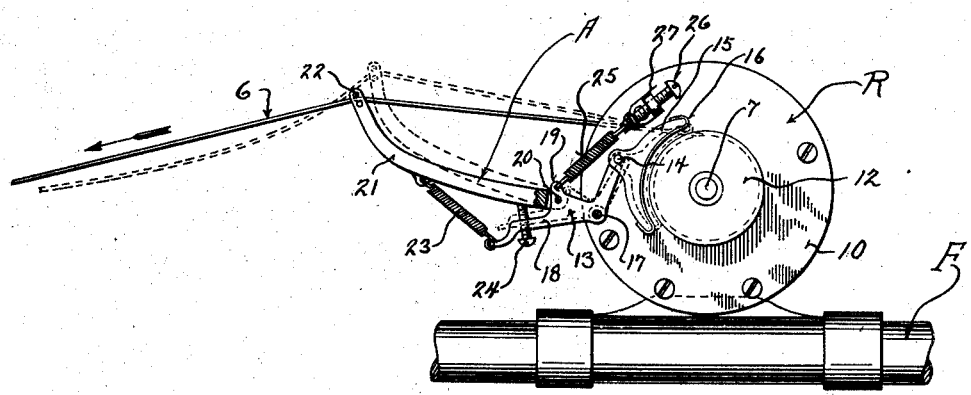
Figure 1 is a side elevational view of a reel equipped with my novel automatic anti-backlash attachment.

The fishing reel R can be considered as of the type now generally found in the open market, and the same will not be described in detail, but it is to be noted that the reel includes the rotatable spool 5 on which is wound the fishing line 6. The spool 5 includes a spool shaft 7, and the spool can be manually rotated by means of a handle 8. The reel also includes end plates 9 and 10, and in accordance with my invention, the shaft 7 is extended beyond the plate 10. The reel can be equipped with various appliances, such as a level wind mechanism 11 for the fishing line 6, and my anti-backlash attachment A is so arranged and constructed as not to interfere with the level wind mechanism 11 or any other operating part of the reel.

Figure 2:
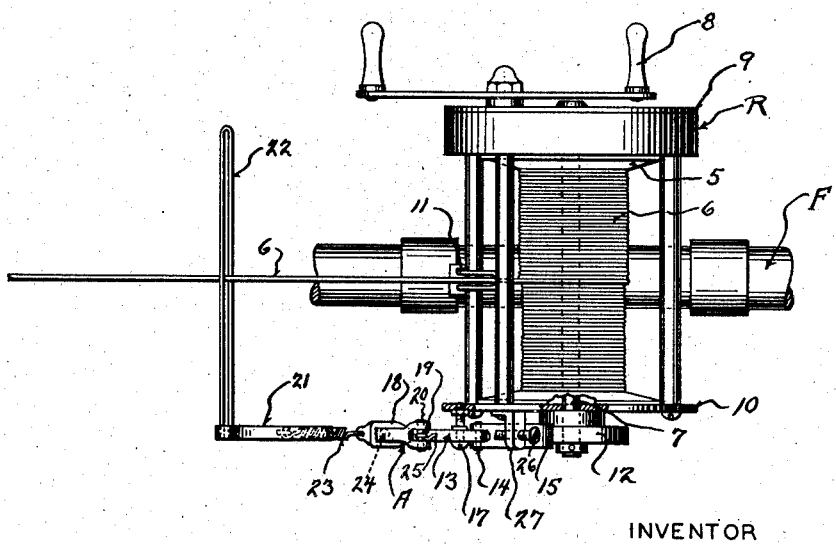
Figure 2 is a top plan view of a reel equipped with my appliance, parts of the view being shown broken away and in section.

The anti-backlash attachment A includes a brake drum 12, which is rigidly fastened to the extended end of the spool shaft 7, and by referring to Figure 2, it can be seen that the brake drum 12 is arranged on the opposite side of the reel from the operating spool handle 8. This brake drum 12 can be constructed from any preferred material, such as fibre, wood, metal, or the like, and is in the nature of a disc.

Rockably mounted on the end plate 10 of the reel at its angle is a bell crank lever 13, and the inner arm of the bell crank has pivotally connected thereto, as at 14, a brake shoe 15. This brake shoe 15 is of an arcuate configuration so as to conform to the periphery of the brake drum 12, and as the shoe freely rocks on its pivot 14, the shoe will readily contact with the drum and conform to the curvature thereof. A wear brake lining 16 can be provided for the inner face of the shoe 15, if such be desired. The pivot 17 for the bell crank 13 can be threaded into the side plate 10 or secured thereto in any other desired way.

The outer arm of the bell crank 13 is extended beyond the reel, as at 18, and the upper face of the outer arm has formed thereon a pivot ear 19. Rockably secured to the ear 19 by a pivot pin 20 is the control lever 21. The control lever 21 can be of an arcuate form and extends upwardly and forwardly, as is clearly shown in Figure 1. The extreme outer end of the operating lever 21 has rigidly secured thereto a laterally extending U-shaped guide 22 for the fishing line 6. The U-shaped guide 22 is arranged directly in front of the reel and the line extends through the guide in front of the level wind mechanism 11. The operating lever 21 is normally urged down toward the extended arm 18 of the bell crank lever 13 by means of a contractile coil spring 23. One end of the spring is connected to the extended arm 18 of the bell crank, and the other end of the spring is connected to the lever 21 at a point intermediate the ends of the said lever.

In order to limit the downward swinging movement of the lever 21 relative to the extended arm 18 of the bell crank lever 13, said arm 18 carries an adjustable stop 24. This stop can be in the nature of a screw and can be turned so as to adjust the same toward and away from the lever 21. Hence, the adjustable stop 24 controls the positon of the lever 21 relative to the extended arm 18 of the bell crank lever.

In order to normally urge the brake shoe 15 into frictional contact with the brake drum or disc 12, a contractile coil spring 25 is provided. One end of the spring is connected with the pivot ear 19 formed on the bell crank lever 13, and the other end of the spring is connected to an adjustable set screw 26 carried by an angle bracket 27, which is, in turn, fastened to the end plate 10 of the reel. By adjusting the screw 26, the tension of the spring 25 can be regulated.

From the description so far, it can be seen that the spring 25 normally pulls up on the outer arm of the bell crank 13, so as to urge the brake shoe 15 into the desired frictional contact with the brake disc or drum 12. As the fishing line 6 extends through the guide 22, any tension or pull on the line will create downward pressure on the guide 22, which pressure will be transmitted to the bell crank, causing the rocking thereof against the tension of the coil spring 25 and the lifting of the brake shoe 15 out of contact with the brake disc or drum 12.

The reel is used in the ordinary way, and in casting the line will create the downward pressure on the guide 22 and raise the brake shoe out of engagement with the brake disc, and, consequently, the spool can run free. However, as soon as a slack in the line occurs, the tension or pull on the fishing line will cease to exist, and, consequently, the spring 25 will pull the brake shoe into frictional contact with the brake disc, which will prevent the overrunning of the reel spool and the consequent tangling of the line. Obviously, with my attachment, overrunning of the spool is prevented, and as my attachment works automatically, the fisherman does not have to give any attention thereto while casting. In re-winding the line on the reel, a pull or tension is again created on the line, which is transmitted to the guide 22, and the bell crank will be rocked for lifting the brake shoe out of engagement with the brake disc.

Particular stress is laid on the fact that the attachment is arranged wholly at one side of the reel, and, consequently, my attachment does not interfere with an operating parts of the reel, and a reel can be used having the ordinary level wind mechanism thereon.

Changes in details may be made, which do not depart from the spirit and scope of my claims, and what I claim as new is:

1. A fishing reel including, a frame having end plates, a spool rotatably mounted in said frame having the shaft thereof extending beyond one end plate, a brake disc secured to said extended end of the shaft and arranged at one side of the reel, a brake shoe rockably carried by one side of the reel, spring means normally urging the brake shoe into frictional contact with the brake disc, and a line guide operatively connected to the brake shoe disposed in front of the spool for moving the brake shoe out of engagement with the brake disc against the tension of said spring, when said guide is moved by tension on said fish line.

2. A fishing reel comprising, a frame having end plates, a line spool having a shaft rotatably mounted in said frame, with one end of the shaft extending beyond one of said end plates, a brake disc secured to the extended end of the shaft for rotation therewith, a bell crank lever rockably mounted on the end plate through which the shaft extends, a brake shoe pivotally secured to the inner arm of the bell crank, a spring connected with the last-mentioned side plate and the bell crank for normally urging the brake shoe into frictional engagement with the brake disc, an operating lever carried by the outer arm of the bell crank, and a laterally extending line guide carried by the lever extending in front of the spool for receiving the line, tension on the line being adapted to rock the bell crank lever through the operating lever against the tension of the spring for moving the brake shoe out of engagement with the brake disc.

3. A fishing reel comprising, a frame having end plates, a line spool having a shaft rotatably mounted in said frame, with one end of the shaft extending beyond one of said end plates, a brake disc secured to the extended end of the shaft for rotation therewith, a bell crank lever rockably mounted on the end plate through which the shaft extends, a brake shoe pivotally secured to the inner arm of the bell crank, a spring connected with the last-mentioned side plate and the bell crank for normally urging the brake shoe into friction engagement with the brake disc, an operating lever carried by the outer arm of the bell crank, a laterally extending line guide carried by the lever extending in front of the spool for receiving the line, tension on the line being adapted to rock the bell crank lever through the operating lever against the tension of the spring for moving the brake shoe out of engagement with the brake disc, and means for adjusting the tension of said spring.

4. In a fishing reel including a frame having end plates, a line spool having a shaft rotatably mounted in said end plates with one end of the shaft extending beyond one of the end plates, an anti-backlash attachment for the reel arranged at one side of the reel, including a brake disc secured to the extended end of the shaft, a bell crank rockably mounted at its angle on the last-mentioned side plate, a brake shoe rockably mounted on the inner arm of the bell crank lever, the outer arm of the bell crank lever having a pivot lug formed thereon, a contractile coil spring connecting said lug with said last-mentioned side plate for normally urging the brake shoe into frictional engagement with the brake disc, a forwardly extending operating lever pivotally mounted to the lug, a contractile coil spring connecting the outer end of the bell crank lever to the operating lever, an adjustable stop carried by the outer arm of the bell crank lever and arranged in the path of downward movement of the operating lever, and a U-shaped guide carried by the outer end of the operating lever extending laterally therefrom and in front of the spool for receiving the line.

JOHN MARGIS, Jr.